United States Patent Office 3,386,807
Patented June 4, 1968

3,386,807
INDICATOR TAPE
Martin I. Edenbaum, Somerset, N.J., assignor to Johnson & Johnson, a corporation of New Jersey
No Drawing. Filed Dec. 24, 1964, Ser. No. 421,102
11 Claims. (Cl. 23—253)

ABSTRACT OF THE DISCLOSURE

An ink solution is disclosed which consists of a solution of zinc diethyldithiocarbamate and bismuth subgallate (or alternatively, zinc dimethyldithiocarbamate and bismuth oxalate and/or bismuth subgallate and/or bismuth subnitrate) and a film forming carrier, preferably vinyl chloride, in an organic solvent, suitably methyl isobutyl ketone. The ink is utilized to form white (or yellow) markings on various substrates by evaporating the organic solvent, markings which become green in color when exposed to a moist atmosphere and a temperature of 250° F. for 30 minutes. The ink is therefore particularly adapted for use as or on a device to be attached to articles which are to be steam sterilized, the device indicating whether or not steam sterilization has in fact occurred.

---

The present invention relates to color change indicators and more particularly to color change indicators which effect a color change under sterilization conditions of high temperature and humidity effected during steam sterilization.

In hospitals, clinics and the like, it is standard practice to sterilize various products such as gowns, drapes, sheets, dressings, and other articles, prior to use by placing them in an autoclave where they are subjected to steam sterilization. This practice is necessary to avoid infection and prevent contamination from the use of such articles where the same are not in a sterile condition and is particularly important where the articles have previously been used in the care of other patients. As there is no visual way of determining whether a particular article is sterile or not, it has been the practice to use, with the article, when placed in the steam sterilization chamber, a color change indicator which changes color under the sterilizing conditions of the autoclave, thus indicating that the particular article or package has been passed through the sterilizing cycle. The indicator may be in the form of a ribbon or card to which a color change ink has been applied.

It is generally the practice in sterilizing such articles to gather several articles together, bundling the same in a porous wrap, and then the package, held together by tying with string or by pressure-sensitive adhesive tape, is placed in an autoclave together with a sterilization indicator. The sterilization indicator may be either inserted in or applied to the package. Where pressure-sensitive adhesive tapes are used for this purpose, it is convenient to have the color change indicator on the tape backing. The visible back of the tape holding the package together then indicates whether not the same has been passed through the sterilization cycle by virtue of its color change. Pressure-sensitive adhesive tapes of this type are, for example, described in U.S. Patent No. 2,889,799.

One of the most commonly used color change markings for this purpose are markings containing sulphur and lead oxide. The sulphur in the presence of the lead oxide, under the conditions of the steam sterilization, changes from a yellow to a black color as it is converted to lead sulfide. It has been the practice to mix the sulphur and the lead oxide together in equivalent molar proportions in an ink base which is then applied to an indicator card or to the back of a pressure-sensitive adhesive tape, which, in turn, is then associated with the articles to be sterilized.

If the autoclave or other steam sterilizing equipment used is not functioning, or if the package to be sterilized inadvertently gets omitted from being placed in the autoclave, this then can readily be determined by the fact that no reaction has occurred between the sulphur and the lead oxide as shown by the lack of color change in the indicator.

Although giving a good color change from a light yellow to a deep black with fresh inks, the color change indicator markings made from the active ingredients, lead oxide and sulphur, tend to lose much of their sensitivity over extended periods of storage. This is particularly true under relatively hot or humid conditions. As a result, the ink markings tend to darken appreciably in storage. Also, markings do not turn to the same deep black on being subjected to sterilizing conditions but tend to assume a dark gray appearance with the result that the color change is not nearly as marked as with fresh inks. The sulphur in the ink also tends to sublime during storage, thus removing part of the sulphur content and further reducing the effectiveness of the ink as a color change indicator. Another difficulty with the conventional sulphur lead oxide color change inks is that they are relatively unstable, necessitating the practice of forming separate solutions of the sulphur and the lead oxide, and then combining the two together just prior to using the ink for marking. This is apparently due to the fact that the sulphur and lead oxide tend to react while in the solvent medium used in forming the ink. If the ink solution is prepared several days prior to its use, a substantial reduction in color change sensitivity results.

Where the color change indicator is to be used in combination with a pressure-sensitive adhesive tape, as by printing the ink on the back of the tape, the inks containing the sulphur have the further disadvantage that the sulpur in the marking tends to migrate into the pressure-sensitive adhesive where the tape is wound on itself in roll form, thus further reducing the sensitivity of the marking to color change when the tape, with the ink marking thereon, is later exposed to steam sterilization conditions.

Despite these inherent disadvantages in color change markings using sulphur and lead oxide, such markings have continued to be used as steam sterilization indicators, as they were still superior to other known color change indicators for indicating steam sterilization.

It is an object of the present invention to make color change indicators which will give a marked color change under steam sterilizing conditions and which are stable over extended periods of storage at normal atmospheric conditions. It is a still further object of the present invention to prepare inks in which the color change pigments are stable for extended periods of time, while still in the liquid ink medium, and from which markings can be made which are stable to color change under normal atmospheric conditions. It is still a further object of the present invention to prepare color change markings free from the deficiencies previously mentioned which are present in color change markings in which free sulphur and lead oxide are the primary active ingredients. Other objects and advantages of this invention will become apparent from the following description wherein are set forth by way of illustration and example certain embodiments of this invention.

It has now been discovered that excellent color change markings can be made by having in the marking, as the active color change ingredients, an intimate mixture of zinc dimethyldithiocarbamate with at least one compound of the group consisting of bismuth oxalate, bismuth subgallate, bismuth subnitrate, and zinc diethyldithiocarbamate in intimate mixture with bismuth subgallate.

It has been found that, when a marking is made from a mixture of zinc dimethyldithiocarbamate with any chemical compound of the group previously mentioned in a steam permeable colorless carrier, a strong contrasting color change occurs under steam sterilizing conditions. There appears to be no critical ratio of the zinc dimethyldithiocarbamate to the other active color change compound. The best results are obtained, however, when the zinc dimethyldithiocarbamate or the zinc diethyl dithio carbamate is present in amounts of 0.5 to 2 molar equivalent parts by weight for each part by weight of the other color change compound. The color change of markings so formed, when subjected to a steam environment for half an hour, is given in the following table.

TABLE.—COLOR CHANGE IN STEAM ENVIRONMENT

| Composition of Marking | Initial Color | Color After 30 Minutes at 250° F. |
|---|---|---|
| Zinc DMDTC [1] plus Bismuth Oxalate | Light yellow | Olive green. |
| Zinc DMDTC plus Bismuth Subgallate | Yellow | Do. |
| Zinc DMDTC plus Bismuth Subnitrate | White | Yellow-green. |
| Zinc DEDTC [2] plus Bismuth Subgallate | Light yellow | Olive green. |

[1] DMDTC=Dimethyldithiocarbamate.
[2] DEDTC=Diethyldithiocarbamate.

It will be noted that the initial color of the ink prior to being subjected to steam sterilizing conditions is white or light yellow and on sterilization changes to green. As green is a color long used to indicate clearance, that the situation is now safe to proceed, the color suggests safety, that is that the article containing the marking has been sterilized and one may now proceed with its use.

The color change ingredients, or pigments, are applied in an ink base containing a film-forming carrier for anchoring the color change pigments to a substrate after the solvent medium used in the ink has evaporated. Although various film-forming resins may be used for this purpose, vinyl resin carriers, such, for example, as Bakelite resin VYHH, a copolymer of polyvinyl chloride and polyvinyl acetate, have been found to be particularly suitable. The concentration in the ink of the color change pigments with respect to the amount of film-forming resin used is not particularly critical. However, there should be sufficient to give a clearly visible marking. In the preferred practice, the color change pigment is present in amounts of about 0.5 to 5 parts by weight per part by weight of the resin carrier. By color change pigment is meant equal molar equivalents of zinc dimethyldithiocarbamate and a compound of the group consisting of bismuth oxalate, bismuth subgallate and bismuth subnitrate, and diethyldithiocarbamate and bismuth subgallate. There is no particular criticality as to the proportion of zinc dimethyldithiocarbamate or the zinc diethyldithiocarbamate to the other active ingredient. The reaction takes place on an equal molar equivalent basis. Any excess of either compound present only serves to dilute somewhat the final color obtained on color change.

Any solvent may be used for the resin film-forming carrier in making up the ink solution. Methyl isobutyl ketone, hereinafter referred to as MIBK, is an excellent solvent for this purpose, particularly where the film-forming resin carrier is a vinyl resin such as Bakelite resin VYHH.

The film-forming resin carrier used must be one which is permeable to steam in order to obtain a satisfactory color change under steam sterilizing conditions. Where the resin film-forming carrier does not of itself have sufficient permeability to steam, it can be made satisfactorily permeable by adding to the ink a small amount of wetting agent of either the anionic or cationic type. Non-ionic wetting agents do not appear to be satisfactory for this purpose.

As the color change indicator of the present invention is quite stable to dry heat, even at temperatures as high as 375° F., the color change inks are well suited for the preparation of temperature indicator tapes of the type described in Patent No. 2,889,799, where the pressure-sensitive adhesive of the type is a heat cured pressure-sensitive adhesive where curing is to be done prior to use of the tape. As curing temperatures for such pressure-sensitive adhesives is frequently as high as 300° F., any color change indicator not showing substantial stability under dry heat conditions at such temperature is not fully satisfactory, as a substantial amount of the sensitivity to color change of the ink is lost during the curing of the pressure-sensitive adhesives. The color change indicator inks of the present invention are thus particularly well suited for the preparation of temperature indicator pressure-sensitive adhesive tapes wherein the color change indicator is carried by the tape.

As the color change is from white or yellow to green the change in color is readily identified. Also the initial white or yellow and the later green point out that the article has been autoclaved.

The invention is further illustrated by the following example which is given for the purposes of illustration only, the invention not being limited thereto.

Example I

A vehicle of the following formulation is prepared:

| | Parts |
|---|---|
| Bakelite resin VYHH | 1.0 |
| MIBK | 2.75 |

The following pigments are ground into 100 parts of this vehicle on a three roll ink mill:

| | Parts |
|---|---|
| Bismuth subgallate | 30 |
| Zinc diethyl dithio carbamate | 25 |

This paste is diluted with half its weight of MIBK to obtain an ink of good viscosity for intaglio printing.

The ink so prepared is rotogravure printed on 30# stock paper which has been surface coated with a white pigmented nitrocellulose lacquer. The print roll used is engraved with a pattern of small diamonds arranged in straight rows running at an angle of 60° to the direction of travel of the paper. A drying oven set at 150° F. is used to flash off the solvent in the ink.

In subsequent steps, the printed paper is top coated with a release coating of Quilon, a water soluble Werner-type chrome complex dissolved in isopropanol and described in Du Pont Bulletin "Quilon Chrome Complex," Bulletin #A18204. The sheet is when mass coated on the opposite side with a pressure-sensitive adhesive of the conventional rubber base type. In both steps, drying temperatures of 200–250° F. for one minute are used.

A pressure-sensitive tape prepared in the above manner printed with an ink containing the reactive compounds bismuth subgallate and zinc diethyl dithio carbamate, is cut in one inch widths, placed in storage at normal atmospheric conditions (RT storage) and in a room kept at 120° F. The tape samples are tested at regular intervals for eight months, with the following results:

RT STORAGE

| Months in Storage | Ink Color Before Auto claving | Ink Color After Auto claving, 250° F., 30 min. |
|---|---|---|
| 0 | Yellow | Olive Green. |
| 1 | do | Do. |
| 3 | do | Do. |
| 4 | do | Do. |
| 8 | do | Do. |

120° F. STORAGE

| | | |
|---|---|---|
| 0 | Yellow | Olive Green. |
| 1 | do | Do. |
| 3 | do | Do. |
| 4 | do | Do. |
| 8 | do | Do. |

Tapes are similarly prepared and tested using the other active color-forming ingredients in the combinations mentioned with similar results. In each instance there is substantially no color change during storage with a marked color change on autoclaving.

Particular embodiments of the invention have been used to illustrate the same. The invention, however, is not limited to these specific embodiments. In view of the foregoing disclosure, variations or modifications thereof will be apparent, and it is intended to include within the invention all such variations and modifications except as do not come within the scope of the appended claims.

Parts, where used in the specification and claims, refers to parts by weight.

Having thus described my invention, I claim:

1. In a steam sterilization indicating device of the type comprising a base and containing marking thereon which changes color when exposed to the conditions of steam sterilization, the improvement comprising: said marking comprising a steam permeable carrier film containing as the active color change ingredients the mixture of zinc diethyldithiocarbamate and bismuth subgallate.

2. A device of claim 1 in which said carrier is a vinyl film.

3. A device of claim 2 in which said carrier is a copolymer of polyvinyl chloride and polyvinyl acetate.

4. In a steam sterilization indicating device of the type comprising a base and containing marking thereon which changes color when exposed to the conditions of steam sterilization, the improvement comprising: said marking comprising a steam permeable carrier film containing as the active color change ingredients the mixture of zinc dimethyldithiocarbamate with at least one material of the group consisting of bismuth oxalate, bismuth subgallate and bismuth subnitrate.

5. A device of claim 4 in which the material of said group is bismuth oxalate.

6. A device of claim 4 in which the material of said group is bismuth subgallate.

7. A device of claim 4 in which the material of said group is bismuth subnitrate.

8. A device of claim 4 in which said carrier is a vinyl film.

9. A device of claim 8 in which said carrier is a copolymer of polyvinyl chloride and polyvinyl acetate.

10. An ink adapted for forming markings which change color under the conditions of steam sterilization comprising an organic solvent, a film-forming carrier, and color change pigment consisting essentially of the mixture of zinc dimethyldithiocarbamate and at least one material of the group consisting of bismuth oxalate, bismuth subgallate and bismuth subnitrate.

11. An ink adapted for forming markings which change color under the conditions of steam sterilization comprising an organic solvent, a film-forming carrier, and color change pigment consisting essentially of the mixture of zinc diethyldithiocarbamate and bismuth subgallate.

References Cited
UNITED STATES PATENTS

| | | | |
|---|---|---|---|
| 2,889,799 | 6/1959 | Korpman | 23—253 |
| 3,028,254 | 4/1962 | Grant | 117—368 |

OTHER REFERENCES

Ionescu-Muscel et al., Chemical Thermodicator in the Textile Industry, Chem. Abs., vol. 58, February 1963, p. 2531.

MORRIS O. WOLK, Primary Examiner.

L. MEI, R. M. REESE, Assistant Examiners.